3,584,334
APPARATUS FOR MAKING SPHERICAL GRANULES
Nobuharu Moriya, Osaka, Japan, assignor to Fuji Denki Kogyo Co., Ltd., Osaka, Japan
Filed July 22, 1969, Ser. No. 843,330
Claims priority, application Japan, Aug. 7, 1968, 43/56,027
Int. Cl. B29b 1/03
U.S. Cl. 18—1                                                  8 Claims

ABSTRACT OF THE DISCLOSURE

An apparatus for converting pelletized powdered material into spherical granules having several tiers of rotary blades mounted in a cylindrical container with the blades being of a particular configuration to impart air currents which affect the travel of the pellets through the tiers of blades, thereby achieving a high efficiency output of uniformly sized granules.

BACKGROUND OF INVENTION

One conventionally known technique for making granules which are extremely small in diameter is a method in which lumps of a suitable size or pellets about 1 to 3 mm. in diameter obtained by adding suitable moisture to the powder and kneading the wet powder are fed to a pelletizer to crush the material. This crushing may be done by members like knife hammers and the granules obtained are then passed through one or more appropriate screens for classification. The particle-size distribution of the particles obtained at this time is determined by the size of the apertures of the screen used. However, particles produced by this technique are in an extremely wide range of particle-size distribution and it is difficult to obtain particles in a narrow range from 0.5 to 0.1 mm. In addition, this method of the prior art is poor in the yield of particles and is impossible to commercially produce at a high rate of efficiency. An improved method and apparatus for making spherical granules from wetted or pasty pelletized materials is described in U.S. Pat. 3,277,520. My invention described herein is a further improvement.

SUMMARY OF THE INVENTION

In accordance with my invention, cylindrical pellets approximately 1 mm. in diameter and 3 to 10 mm. in length are fed into a cylindrical container to pulverize the pellets by rotary blades rotated at a high speed in the cylindrical container. This pulverization operation is continuously carried out while the particles being pulverized are suspended in a turbulent air stream produced by the high speed rotation of the rotary blades so as to make the particles uniform in size, and the resultant particles are further dropped onto a classifying disc revolving in the lower position for the classification of a predetermined size range of particles which is conducted by utilizing the clearance between the outer periphery of the classifying disc and the cylindrical container. While being thus classified, the particles are further dropped onto a plate disposed under the disc for making the spherical shape of the particles uniform. In this manner, spherical granules of desired diameters are obtained.

The apparatus of my invention comprises a vertical rotary shaft disposed in the center of a cylindrical container, a suitable number of rotary blades mounted on the rotary shaft in layers vertically spaced apart by an appropriate pitch and having knife-like arms in asteroidal shape, the forward ends of some of the arms being twisted and bent, some being bent obliquely upward and some obliquely downward, a classifying disc disposed below the rotary blades with a suitable clearance formed between the disc and the inner wall of the cylindrical container, and a plate for making uniformly spherical shaped particles disposed under the disc at a suitable clearance apart from the inner wall of the cylindrical container and formed with a rugged surface. The rotary blades, classifying disc and plate are adapted for rotation at a high speed.

The present invention will hereinafter be described in detail with reference to the accompanying drawings, in which:

DESCRIPTION OF THE PREFERRED EMBODIMENT

Figure 1:
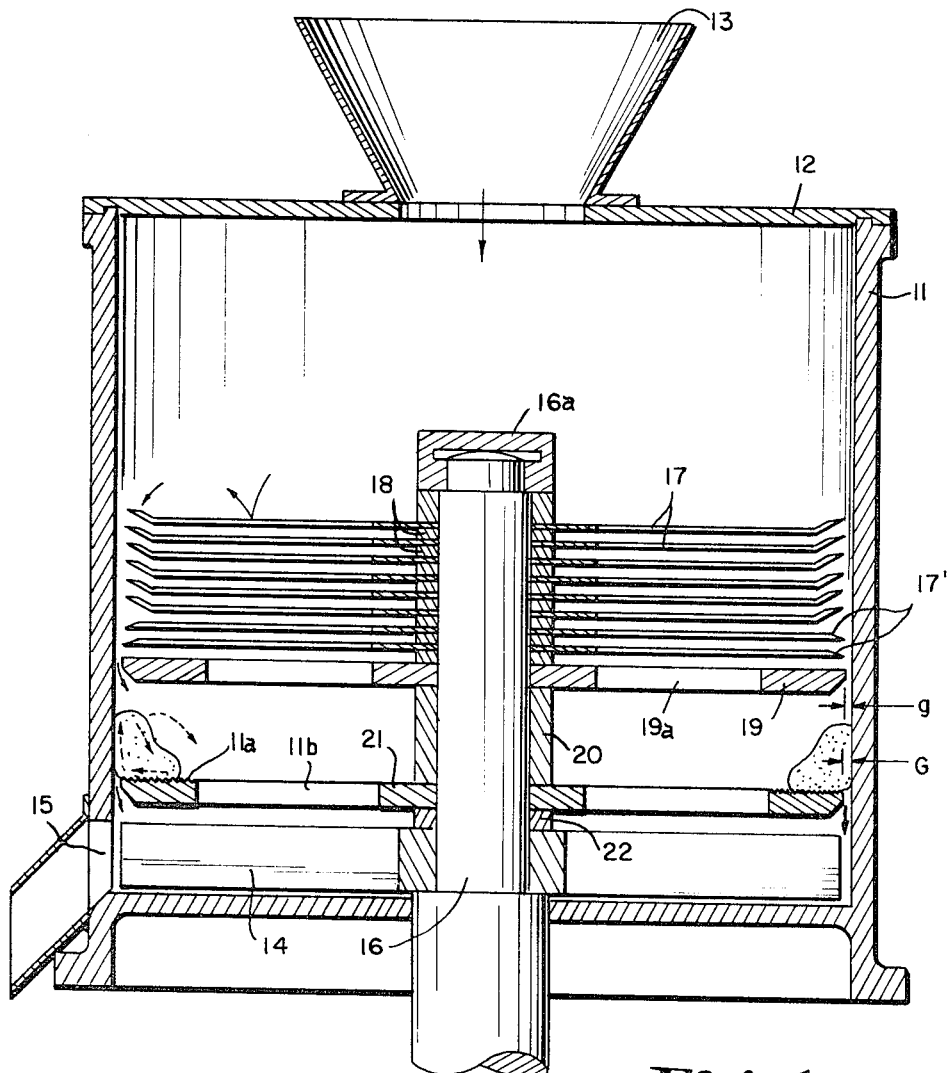
FIG. 1 is a view in vertical section showing an embodiment of the present invention.

Referring to the drawings, designated at 11 is a cylindrical container having a cover 12 and a hopper 13 for feeding material. In the inner bottom portion there is provided a discharge blade 14 adapted to be rotated for discharging spherical granule products through an outlet 15. Designated at 16 is a rotary shaft disposed vertically in the center of the cylindrical container 11 to be rotated at a high speed by driving means (not shown). A suitable number of radially extending rotary crushing blades 17 are mounted on the rotary shaft 16 in layers vertically spaced apart by a suitable distance with spacers 18. Disposed below the blades are a classifying disc 19, a spacer 20, a plate 21 for making the spherical shape of particles uniform, a spacer 22 and discharge blade 14 positioned in the lowermost portion. These members are integrally fixed to the rotary shaft 16 by a nut 16a and are adapted for high speed rotation.

Figure 2:
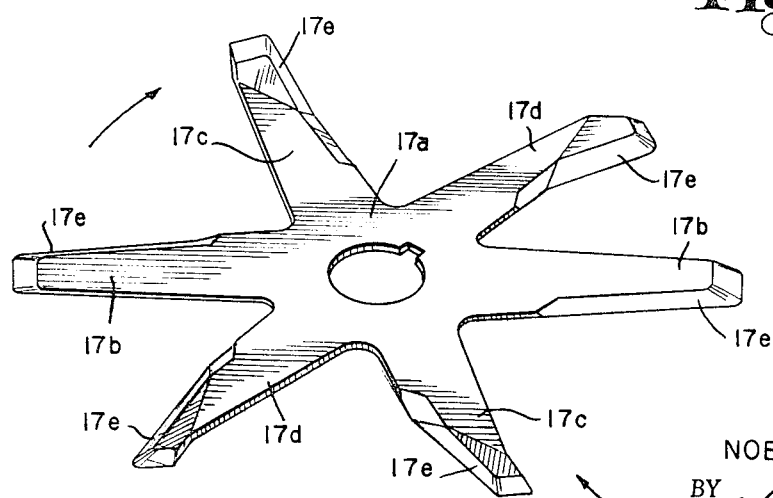
FIG. 2 is a perspective view showing a rotary blade.
Figure 3:
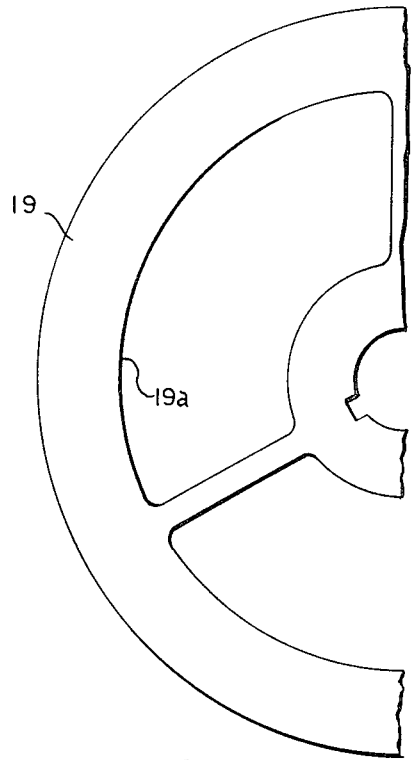
FIG. 3 is a plan view showing one half of a classifying disc.
Figure 4:
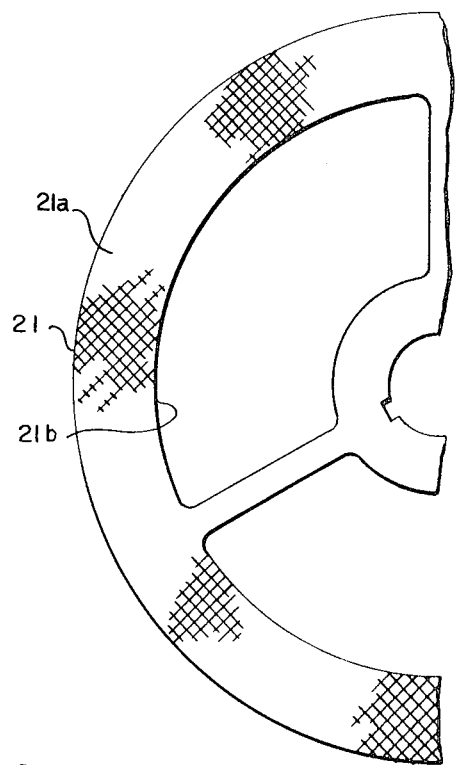
FIG. 4 is a plan view showing one half of a plate for making the spherical shape of particles uniform.

Each rotary blade 17 (FIG. 2) is formed in asteroidal shape with arms 17b, 17c, and 17d radially extending from the center fixing portion 17a. At the end and the front side relative to the direction of rotation, each of the arms 17b, 17c, and 17d, a knife edge 17e is provided. Some of the edges are bent obliquely upward or obliquely downward in a twisting fashion. In the embodiment shown in the drawing, the forward ends of the arms 17c are bent obliquely upward while the forward ends of the arms 17d are bent obliquely downward. Rotary blades 17' have arms which merely extend straight horizontally in asteroidal form. A suitable clearance is formed between the forward ends of the rotary blades 17, 17' and the inner wall of the cylindrical container 11.

The classifying disc 19 is spaced apart from the inner wall of the cylindrical container 11 by an appropriate clearance g. The plate 21 for making the shape of spherical granules is of a construction similar to the classifying disc 19 but the surface of plate 21 is formed with small projections and indentions 21a of suitable sectional form (such as die-like projections and indentions trapezoidal or rectangular in section, or pyramid-like projections and indentions triangular in section). A suitable clearance G is formed between the plate and the inner wall of the cylindrical container 11. The product discharge blade 14 has arms which extend radially from the shaft to discharge the product through outlet 15 as it drops through the clearance G between the plate 21 and the inner wall of the container 11. Openings 19a and 21b formed respectively in the classifying disc 19 and plate 21 serve to facilitate passage of air within the apparatus to prevent the particles from sticking to each other due to their viscosity.

The apparatus of the present invention thus constructed carries out an operation in which wet cylindrical pellets 1 mm. in diameter and 3 to 10 mm. in length produced by an extruder are fed to the cylindrical container 11 through hopper 13 and discharged as spherical granules approximately 0.5 to 0.1 mm. from the product outlet 15 in the lower portion of the cylindrical container 11. This operation will be described below. The above-mentioned cylindrical pellets fed in are struck and crushed by the edges 17e of the rotary blades 17 which are revolving in the cylindrical container 11 at a high speed and at the same time they are moved around the inner wall of the cylindrical container 11 by being subjected to centrifugal force.

Since the arms 17c and 17d of the rotary blades 17 are obliquely upwardly or downwardly bent at the forward ends as previously described, the rotation of the rotary blades 17 vigorously agitates the air in upward and downward movement along the inner wall of the cylindrical container 11 to produce a turbulent air stream within the container. The pellets which are being pulverized are carried in the turbulent air stream and subjected to vigorous upward and downward movement. That is, the cylindrical pellets, while being agitated in the turbulent air stream, are crushed by the rotary blades 17 upon striking thereagainst. Simultaneous with this crushing action, the rotary blades 17 cut the air current into upper and lower currents by the blades 17e so that eddy currents are produced behind the rotary blades 17 relative to the advancing direction. Thus, the rotary blades 17 produce complex currents of air along the inner wall of the cylindrical container 11 while applying centrifugal force on the cylindrical pellets which are being pulverized to circulate them along the inner wall of the container 11. To observe the respective pellets in this condition, the pellets which are relatively great in diameter and slow to break tend to advance in a circular planar flow path due to the energy of centrifugal force acting thereon notwithstanding a turbulent stream and accordingly, they tend to be crushed primarily by the rotary blades 17. On the other hand, the pellets which have been crushed to small particles flow on the turbulent stream, rather than being primarily affected by the centrifugal force exerted thereon. Furthermore, suspended in the upper and lower streams divided by the edges 17e of the rotary blades 17, these smaller particles are caught in the above-mentioned currents. Accordingly, they are not so likely to strike against the rotary blades 17, with the result that hardly any over-pulverization takes place.

As the cylindrical pellets are reduced to smaller sizes, it becomes less likely that they impinge on the rotary blades 17 and as a result the pulverized particles are made more uniform in size within a desired range.

The particles produced upon being pulverized by the rotary blades 17 gradually fall downward to reach the classifying disc 19. The classifying disc 19, revolving at high speed and spaced an appropriate clearance g (usually 2 to 3 mm.) apart from the inner wall of the cylindrical container 11, exerts centrifugal force upon the particles thereon and moves them toward the inner wall of the cylindrical container 11. Since part of the turbulent air stream is pushed out downwardly from the clearance g, the particles reduced to desired sizes are carried on this stream downward without sticking to the inner wall of the cylindrical container 11 as indicated by the arrow in FIG. 1. The particles of greater diameters strike against the cylindrical container 11 due to the centrifugal force and are driven back against the overlying rotary blades 17 for further pulverization. That is to say, the air passing through the clearance g performs classification by carrying the particles of desired diameters and releasing them downward while serving to keep the inner wall of the cylindrical container 11 always dry thereby preventing particles from sticking to the inner wall when they impinge thereon.

Figure 5:
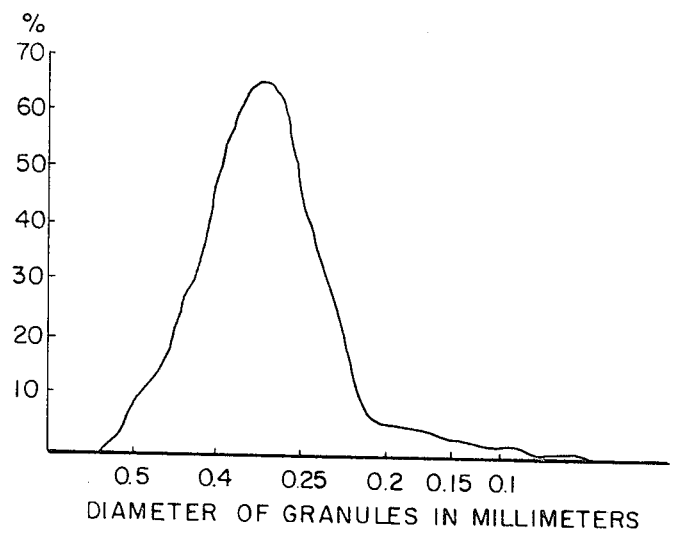
FIG. 5 is a graph showing an example of particle-size distribution of granules produced by the apparatus of my invention.

When granules of desired small diameters (0.5 to 0.1 mm.) are to be produced, the number of rotary blades 17, distance between the blades, revolution speed of the rortary shaft 16, thickness of the rotary blades 17, degree of bending at the ends of the blades and clearance between the classifying disc 19 and inner wall of the cylindrical container 11 are appropriately determined considering the properties of the material (i.e. water content, hardness and sticking property of the pellets, etc.), whereby an ideal particle-size distribution can be obtained as shown in FIG. 5. Needless to say, a desired particle-size distribution can be achieved by varying these factors.

The particles dropped through the clearance g between the classifying disc 19 and the inner wall of the cylindrical container 11 are positioned on the plate 21 for making the spherical shape of particles uniform which is disposed under the disc 19. Since the plate 21 has an indented surface 21a and revolves at a high speed, the particles dropped onto the plate 21 are thereby imparted with centrifugal force and forcibly driven against the stationary inner wall of container 11. The particles repetitively rise and fall to flow in a doughnut-like fluid path as shown in section in FIG. 1. The combination with the frictional force between the inner wall of the container and the particles, and the centrifugal forces imparted by plate 21 produces a twisted doughnut-like fluid flow on the plate 21. This flow pattern resembles the tracking of a strand in a twisted rope as indicated in the drawing by the broken-line arrow. The respective particles are brought into frictional contact with one another within the fluid layer and shaped into spherical form. Since the contacting area reduces as the particles are formed into spheres, they are moved out of the fluid layer to drop through the clearance G between the plate 21 and the inner wall of the container 11 and are discharged from the apparatus through the outlet 15 by the discharge blade 14. This clearance G is ordinarily smaller (e.g. 2 to 1 mm.) than the clearance g between the classifying disc 19 and the inner wall of the container.

Preferably, the spherical granules output obtained by the present invention achieves the particle-size distribution shown in FIG. 5. An example of the particle-size distribution of the spherical granules actually produced by the present invention is shown below:

(a) Material (carrier for pharmaceuticals)

| | Percent |
|---|---|
| Lactose | 60 |
| Starch | 20 |
| Avicel | 20 |
| Water (based upon wet quantity) | 32.5 |

(b) Specification of the apparatus

| | |
|---|---|
| Number of rotary blades 17 (the lowermost two blades have no bent ends) | 8 |
| Thickness of rotary blades mm | 2 |
| Distance between blades mm | 7 |
| Clearance g mm | 3 |
| Clearance G mm | 2 |
| Revolution speed of shaft 16 r.p.m | 870 |

(c) Particle-size distribution

| | Percent |
|---|---|
| 0.5 mm. and over | 9.8 |
| 0.5 to 0.3 mm. | 25.4 |
| 0.3 to 0.1 mm. | 61.5 |
| 0.1 mm. and less | 3.3 |

As set forth above, the present invention has various advantages that it is capable of achieving almost ideal particle-size distribution with high yield of product and is well fitted for the production of spherical granules of extremely small diameters (0.5 to 0.1 mm.) with high efficiency.

I claim:

1. An apparatus for making spherical granules comprising a cylindrical container, a vertical rotatable shaft disposed in the center of said cylindrical container, a plurality of blades radially extending from said rotary shaft in vertically spaced apart layers, the forward ends of some of said blades being bent obliquely upward, a classifying disc disposed on said shaft and below said blades with a predetermined clearance provided between said disc and the inner wall of said cylindrical container.

2. An apparatus for making spherical granules as defined in claim 1 in which some of said blades have forward ends bent obliquely downward.

3. An apparatus for making spherical granules as defined in claim 2 in which a plate is mounted on said shaft and spaced a predetermined clearance under said disc and from the inner wall of said cylindrical container, said plate having indentation on its upper surface.

4. An apparatus for making spherical granules as defined in claim 3 in which said cylindrical container has an inlet hopper mounted above said blades.

5. An apparatus for making spherical granules as defined in claim 4 in which said cylindrical container has an oulet for discharge of spherical granules positioned beneath said plate.

6. An apparatus for making spherical granules as defined in claim 5 in which each of said blades comprises a plurality of knife-like arms connected together in asteroidal shape.

7. An apparatus for making spherical granules as defined in claim 6 in which the lowermost of said blades has straight forward ends.

8. An apparatus for making spherical granules as defined in claim 7 in which a discharge blade radially extends outwardly from said shaft beneath said plate.

References Cited

UNITED STATES PATENTS

| 3,277,520 | 10/1966 | Nakahara | 18—1 |
| 3,461,487 | 8/1969 | Miller | 18—1 |

TRAVIS S. McGEHEE, Primary Examiner

U.S. Cl. X.R.

241—188